March 1, 1960 W. BENNETT 2,926,928
UNITARY FLOOR AND FRAME STRUCTURE FOR VEHICLES
Filed April 17, 1957 3 Sheets-Sheet 1
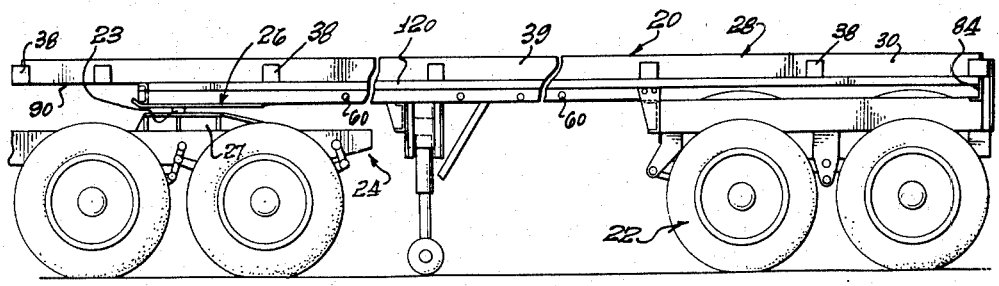
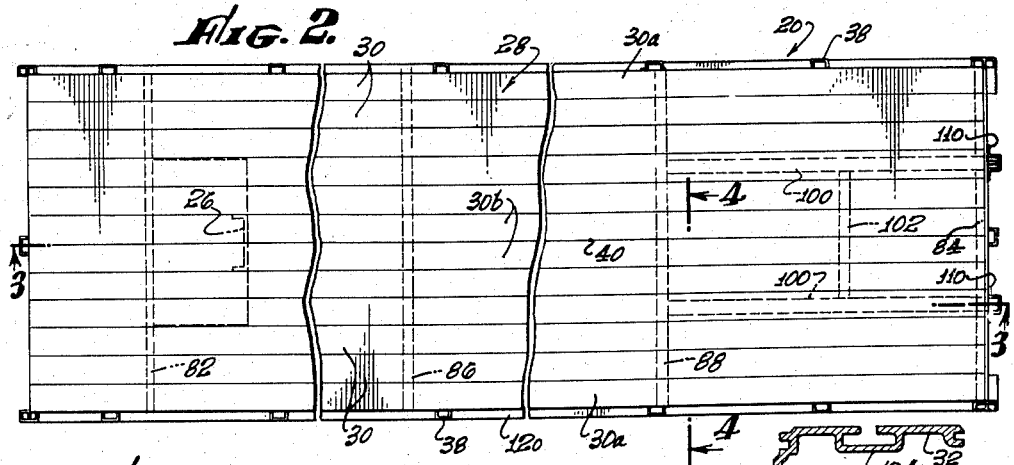
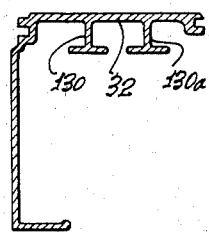
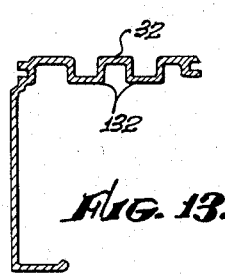
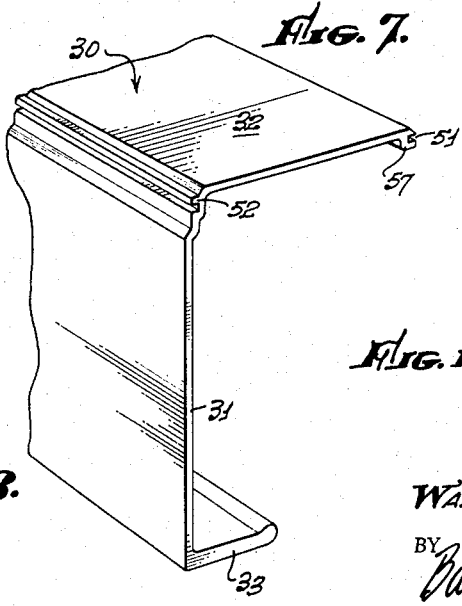
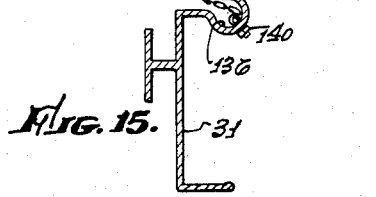
INVENTOR.
WALTER BENNETT,
BY Barkdew & Lewis

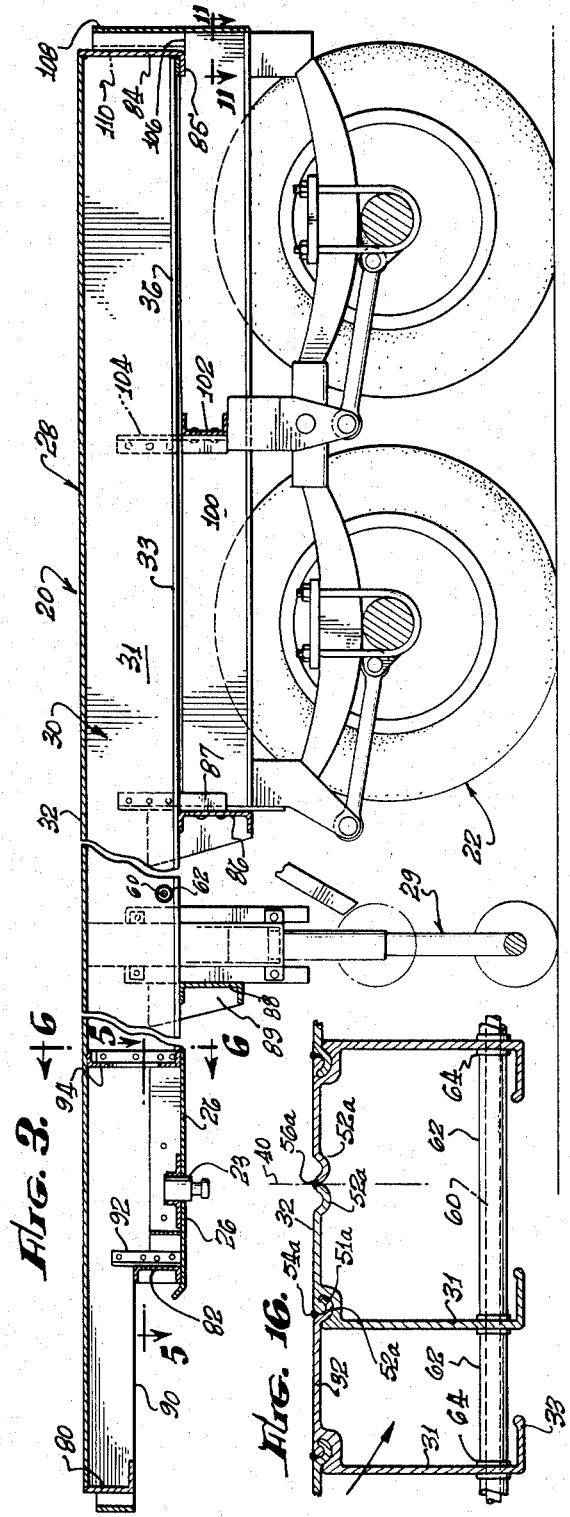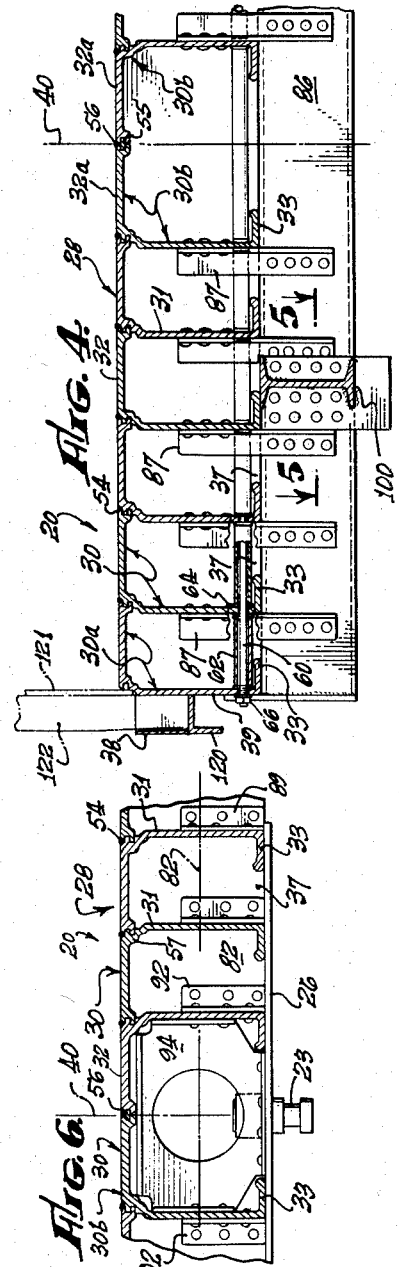

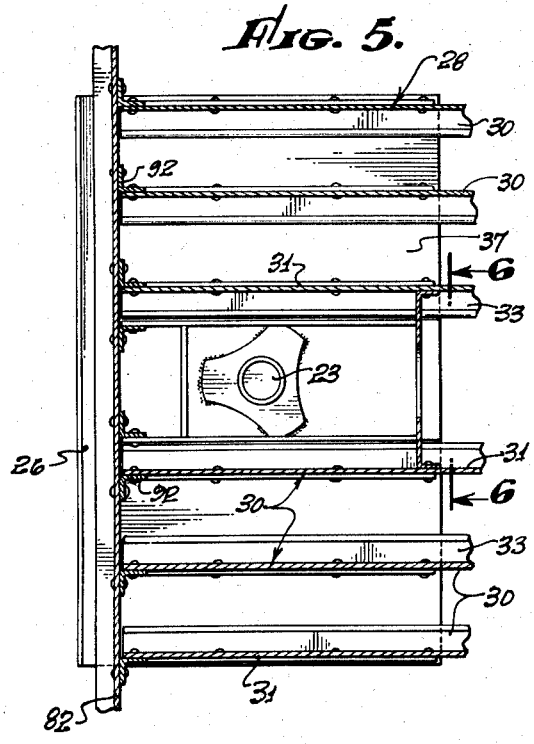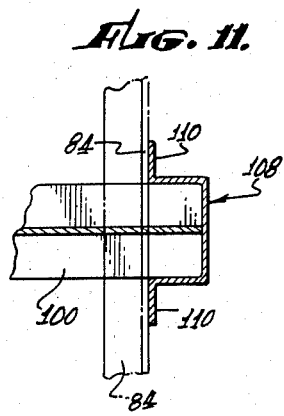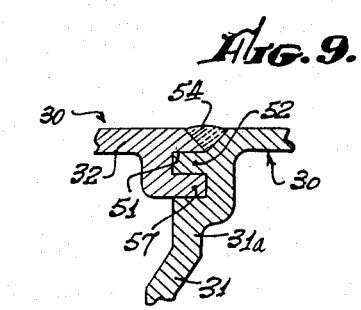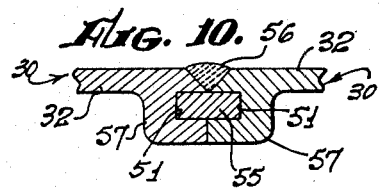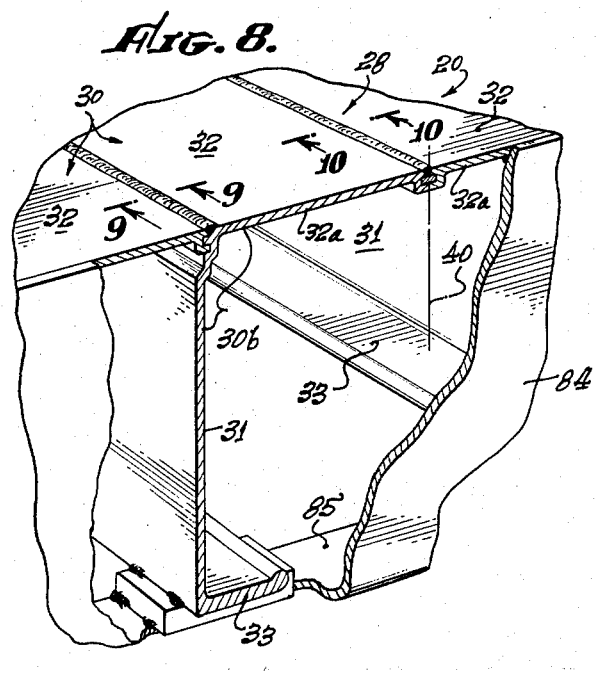

United States Patent Office 2,926,928
Patented Mar. 1, 1960

2,926,928

UNITARY FLOOR AND FRAME STRUCTURE FOR VEHICLES

Walter Bennett, Los Angeles, Calif., assignor to Utility Trailer Manufacturing Company, Puente, Calif., a corporation of California Application April 17, 1957, Serial No. 653,363

7 Claims. (Cl. 280—106)

This invention relates generally to vehicle structures and more particularly to frame and floor structures for vehicles. Although the invention is not limited to incorporation or use in any particular type of vehicle, the present embodiment of the invention has been designed for use in vehicles of the semi-trailer type. The invention will therefore be described in illustrative form as applied to that type of vehicle, but with the understanding that, in its broader aspects, the invention is not thereby limited.

The general primary object of the invention is the provision of a unitary structure that performs the functions of both frame and floor for the vehicle, and to provide such a structure in simple form, easily and inexpensively manufactured, strong and reliable in service. One of the characteristics of the invention resides in its floor and frame unit made up of laterally adjoining longitudinal members, which may all, or most of them be identic, and which are so assembled and joined as to form a unit capable of transversely distributing the loads imposed on it and having torsional flexibility.

Other objects and corresponding characteristics of the invention will be best understood from the following description of the illustrative embodiment in the following specification, such illustrative embodiment being illustrated in the accompanying drawings, in which:

Fig. 1 is a side elevation showing a typical semi-trailer embodying the illustrative form of the invention;

Fig. 2 is a plan of such trailer;

Fig. 3 is an enlarged longitudinal vertical section on line 3—3 of Fig. 2;

Fig. 4 is an enlarged fragmentary section on line 4—4 of Fig. 2;

Fig. 5 is a horizontal section on line 5—5 of Fig. 3;

Fig. 6 is a fragmentary section on lines 6—6 of Figs. 3 and 5;

Fig. 7 is a perspective showing a typical form of a longitudinal member for the unitary frame and floor;

Fig. 8 is a fragmentary perspective showing the structure at the rear end of the unitary frame and floor;

Figs. 9 and 10 are enlarged detail sections on lines 9—9 and 10—10 of Fig. 8;

Fig. 11 is an enlarged detail section on line 11 of Fig. 3;

Figs. 12 to 15 are sections showing illustrative variant forms of the longitudinal member; and Fig. 16 is a section showing another modification.

An illustrative semi-trailer in accordance with the invention is indicated generally by the numeral 20. It is supported by rear running gear 22, which may be of conventional design, and by suitable fifth-wheel and king pin structure 26, 23 at its forward end supported on the conventional table 27 carried by the tractor.

The main frame and unitary floor 28 of the semi-trailer are constructed in a particularly simple unitary manner, and comprise a plurality of longitudinally extending channel members 30. Channel members 30 are arranged in adjoining side by side relation with their webs 31 vertical and their upper flanges 32 in a common plane to form the floor surface. The edge of each upper flange 32 engages the adjacent channel member and is rigidly connected to it, as will be more fully described, forming a substantially flat floor surface. The lower flanges 33 of channel members 30 preferably are narrower and thicker than upper flanges 32, so that open spaces indicated at 37 are left between the edge of each lower flange 33 and the adjoining channel 30. That form of the channels provides greater strength per unit length, and the spaced relation facilitates connection of further structural members to be described.

The longitudinal channel members 30 on each side of the central longitudinal plane of the vehicle, indicated at 40 (Figs. 4 and 6) preferably face toward that plane. The outer web surfaces 39 of outer channel members 30a thus provide satisfactorily smooth and strong side faces for the vehicle frame, on which further structure such as the stake pockets 38, for example, can conveniently be mounted. The upper flanges 32a of the two innermost channel members 30b extend toward each other, with the adjoining edges of those upper flanges interlocked, as explained below.

As shown best in Figs. 9 and 10, a tongue-and-groove structure is preferably provided to integrate and strengthen the described floor construction. As shown, the edges of upper channel flanges 32 are formed with grooves 51, adapted to receive tongues 52 which are formed on the outer faces of the adjacent webs 31. The longitudinals are thus interlocked. The upper adjacent edges of adjoining channel members may also be beveled to facilitate welding, as indicated at 54. The adjoining grooves 51 of the upper flanges 32 of the two central channel members 30b are interlocked in alignment by means of a longitudinal fitting strip 55, and may be welded together as indicated at 56. The thickening of the upper flange edges, indicated at 57, which is typically required to provide the grooves 51, is preferably located entirely below the plane of the floor.

The several channel members 30 are tied together transversely near their lower edges by suitable ties, here shown as tie rods 60. These rods extend through the complete set of channels just above the lower flanges. Spacers 62, with washers 64, space the channel webs, and the tie rods are set in pre-stressed tension by nuts 66 on their ends. By this provision the unitary structure, with transverse tensile strength near its lower plane, acts as a strong beam transversely and distributes its loads transversely without appreciable deformation in a transverse plane. An this structure does not interfere with the desired torsional twisting of the unit, spoken of later.

In the forms so far described, the assembly has transverse compressive strength at its top, and transverse tensile strength across its bottom. The welds are not necessary to the upper transverse compressive strength, but tie the longitudinals together to prevent relative longitudinal slippage. (However, the transverse end members, described below, also do that.) The welds also prevent any lateral spreading of the longitudinals.

The upper flanges 32 form an integral continuous upper flooring in the nature of a plate integrated with the webs 31 below it. This is true whether or not the flange edges are welded to the tops of the adjacent webs, or are only spot welded; as the whole upper flange assembly is, when loaded, under transverse compression.

Fig. 16, shows a modified sectional form for the longitudinals, wherein the interlock in their upper parts also ties the longitudinals together as regards spreading. In that form, the outer edges of the upper flanges are provided with a hook-shaped tongue 52a and the upper margins of the webs are provided with complementary grooves 51a. Adjacent longitudinals are assembled by swinging one with relation to the next, as indicated by the arrow in Fig. 16. Such an interlock prevents spreading as well as holding the upper flanges in the same plane. If desired, welds may be applied as at 54a. And the two abutting flange edges at the center of the assembly may be also secured together by any suitable means, as by the weld shown at 56a.

In the form of Fig. 16, the tie rods 60 have an additional function. With the longitudinals at opposite sides of the center facing oppositely, the rods also have the function by tying the bottoms together, of preventing the relative swinging (in a direction opposite to that of the arrow in Fig. 16) that would disengage the hooked interlock. In this connection, it will be understood that the tie rods here extend through the whole assembly with stressing nuts at their outside ends, as in the other figures.

It is noted that none of the welds, such as those shown at 54, 56 or 54a, 56a, need be continuous; they can be space spotted longitudinally of the members.

The described extremely simple unitary frame and floor structure provides satisfactory strength for supporting any concentrated loads that may be placed on the vehicle. However, the invention further provides means for distributing over the width of the frame-and-floor structure the relatively concentrated upward forces exerted by the running gear, and by the trailer fifth wheel structure. At each of those areas of frame support, the assembly of channels is stiffened by transverse load distributing members. Those members are preferably arranged in supporting relation to all of the longitudinal channel members 30. The main central portion of the unitary frame and floor is preferably free of such transverse members, saving unnecessary weight and also maintaining torsional flexibility of the entire structure.

Transverse load distributing members are typically provided at substantially the extreme forward and read ends of the frame, as represented in the present embodiment by forward transverse members 80 and 82, and rear transverse member 84. A transverse channel 86 is also provided at the forward end of the running gear frame. And the forward portion of the main frame may, if desired, be further stiffened transversely at the location of the support gear 29, as by the transverse channel 88. Each of the transverse channels 86 and 88 directly underlies the complete set of longitudinal channel members 30 in directly supporting relation, and is rigidly connected to each of them in any suitable manner. An illustrative type of connection utilizes vertical brackets 87 and 89 of angle iron. It will be noted that the brackets (see e.g. Fig. 4) extend up through the spaces 37 before referred to. The two flanges of the brackets are fixedly secured, as by rivets, to the back faces of the webs of the longitudinal and the transverse channels, respectively. That type of connection provides rigid vertical relation of the connected members.

The fifth wheel plate 26 underlies the frame and floor longitudinals 30 at the forward end of the frame, or spaced back somewhat from that forward end as typically illustrated in Fig. 3. The fifth wheel plate is suitably secured to the lower flanges 33 in any suitable manner, as by welding. The transverse channel 82 overlies the forward edge portion of the fifth wheel, the longitudinals 30 being cut away at and forward of 82, as illustrated at 90. The upper face of 82 bears upwardly against those cut-away portions; and channel 82 is secured to the longitudinals by angle brackets 92. A web plate 94 extends over the rear edge of the fifth wheel plate across the space between the two innermost longitudinals 30 (Figs. 3 and 6) to back up that plate across that relatively wide space. The web plate is secured to the adjacent longitudinals, as by riveting; and it may also be secured to the fifth wheel plate.

It will be noted that the fifth-wheel plate bears directly on the lower flanges of the longitudinals 30; and that the transverse load distributing member 82 is located over the fifth wheel—high enough that its outer ends cannot come in contact with the wheel tires of the rear running gear of the tractor.

The other forward transverse member 80, in the form of an angle, extends across, and under, the forward ends of the longitudinals and is secured thereto, as by welding.

The rear transverse load distributing member 84 extends across the rear ends of the longitudinals 30, welded thereto, and has an angle flange 85 underlying those rear ends. The frame of running gear 22 embodies two longitudinal beams 100 connected to the transverse load distributing beam 86 and extending to and longitudinally somewhat beyond the rear ends of longitudinals 30. Medial of their length beams 100 may be transversely joined by frame member 102 which may be secured to the longitudinals 30 by angle brackets 104. At the flange 85 of rear transverse member 84, the frame longitudinals 100 are cut away as indicated at 106, the edges of those reduced portions bearing upwardly against flange 85. A box-like or channel-shaped bracket member 108 (Figs. 3 and 11) encloses the end of each beam 100, is welded thereto, and has flanges 110 welded to the end transverse member 84.

A side scuffing rail 120 (Figs. 1 and 4) may be provided on the outer surfaces of the outermost longitudinals 30, underlying stake sockets 38. If such members as the scuffing rail and sockets are not formed integrally with those longitudinals, then those longitudinals may be identical with all the other longitudinals; all of them can then be formed, for example, by extrusion in a single die, or rolled with identic rolls. In that connection it will be noted (Figs. 4 and 9) that the upper edges of the webs 31 of longitudinals 30 are inwardly offset, as best shown at 31a in Fig. 9. That inward off-set (Fig. 4) allows side boards 121 to be slipped into place inside stakes 122 with their lower edges held between the stages and the off-set.

Various detail modifications may be made in all the longitudinals 30, or in the two external ones. Figs. 12 to 15 illustrate typical variations. In Fig. 12 longitudinal stiffening ribs 130 are shown under the upper flange 32. Such ribs stiffen the flanges that immediately carry the load; and the (or a) flange 130a close to the edge of flange 32 stiffens that flange edge. That, or similar stiffening, may be particularly desirable in the two central longitudinals 30 where the inner flange edges are not directly supported by a web of an adjacent longitudinal.

Fig. 13 shows longitudinal stiffening corrugations 132 which have the same reinforcing effect as the ribs 130 of Fig. 13; and in addition provide a longitudinally corrugated floor surface which is desirable for some purposes. And Fig. 14 shows a slotted corrugation 134 which may be used for anchoring a tie-down.

Fig. 15 shows an additional formation that may be used for the two outside longitudinals. As shown there, a longitudinal recess 136 is formed in the upper, outer corner between the web 31 and the upper flange 32. A hold-down, such as a chain 138 may be anchored at one end, as at 140, and stored in the recess when not in use.

One of the advantageous features of my unitary floor and frame structure is that it does not, at least for any ordinarily distributed load, need any transverse stiffening members between the forward load distributing member 82 and the rearward load distributing transversals over the rear running—here illustrated by the transverse beam 86 and the rearmost plate 84. The major length of the structure, here illustrated by the length between 82 and 86 may be, and preferably is, devoid of transverse stiffening members. The transverse beam at 88 may either be omitted, or it may be relatively small, or it may extend only under the central longitudinals. The advantage gained by that absence of substantial transverse stiffeners over the major part of the length is that the floor-frame unit has a desirable amount of torsional flexibility about its central longitudinal axis. That has the desirable effect of relieving the fifth wheel structure and the running gear of a large proportion of the shock strains that they are otherwise subject to.

One of the primary reasons for the advantageous features of the invention resides in the described symmetric assemblage of the longitudinal elements, with asymmetric sections such as described, and transversely tied together in the manner described. Due to the fact that the upper floor forming flanges 32 extend only, or predominantly, from webs 31 toward the central longitudinal axis 40, each of the longitudinal elements, under load applied to the upper flange, tends to rotate under stress, in the planes of its cross-sections, about its longitudinal axis of section moment. That stress tendency is so, whether or not the longitudinal flange edges are secured, as by welding, to adjacent elements; but is most marked if they are not so secured, or the joints have failed, and the several elements are then held against relative longitudinal movement by the end members 80 and 84. And that is true, whether or not each longitudinal element has the lower flange 33 of limited width; but those lower flanges accentuate the following described functions.

Under load, each longitudinal element 30 to the left of central plane 40 in Figs. 4 and 6 tends under the load stress to rotate clockwise about its section axis; tending to press its upper flange 32 toward central plane 40, and tending to flex its lower web edge and flange 33 outward away from central plane 40.

Likewise, each longitudinal element 30 to the right of central plane 40, tends under load stress to rotate about its section axis of moment in counter-clockwise direction in Figs. 4 and 6; tending to press their upper flanges 32 also toward the central plane to flex their lower edges outward away from that plane.

The transverse ties 60, spaced at suitable longitudinal intervals between the primary support-and-load-distributing transverse beams, e.g., 86 and 82 or 88, tie all those lower edges together and, due to the symmetric arrangement, inhibit the outward flexings of those lower edges. That inhibition puts additional inward pressure on the upper floor forming flanges 32, putting them under additional opposed compression toward central plane 40.

Thus, under load, the upper floor forming flanges are put under opposed and balanced pre-compression in their horizontal planes. That additional compression tends to hold them more tightly together, the compression and tightness being greater with greater loads. There is thus no force, under any loading conditions, tending to separate the upper flanges. And, due to the symmetric arrangement with the ties acting between only the longitudinal elements, torsional flexibility, about a longitudinal axis, of the whole structure between the support transversals, e.g. 82 and 86, is unimpaired.

And another outstanding advantage of my unitary floor-frame structure is that, for any given load-carrying strength, its over-all vertical dimension is markedly less than the over-all vertical dimension of the usual structure involving a lower frame surmounted by a floor structure. That reduction in vertical dimension makes it possible, for instance as shown here, to mount the fifth wheel directly under a vertically full dimensional part of the structure, instead of, as is usual, reducing the vertical dimension of the frame in its forward parts over the fifth wheel.

I claim:

1. A unitary floor and frame structure for vehicles, comprising in combination an assembly of a plurality of elongate longitudinal members in mutual lateral edge contact, each of said longitudinal members having a vertical web and a horizontal floor-forming flange projecting from one side only of said web at its upper edge, the flanges of the members at opposite sides of the central longitudinal axis of the assembly projecting from their webs toward said central axis, the flanges of the two members immediately adjacent the central axis mutually contacting along the length of their edges, the flanges of all the other members contacting an adjacent member along the length of the upper edge of the latters' vertical web, means interlocking all the members together along their lengths of contact, each longitudinal member having a second flange projecting from the same side of its vertical web at the lower edge, said second lower flange being of less lateral width than the upper floor-forming flange, leaving an open space between the edge of said lower flange and the web of an adjacent member, a load distributing beam extending transversely under the assembly of longitudinal members and bearing upwardly against their lower flanges, and brackets attached to said beam, extending up through the said open spaces, and attached to the webs of the longitudinal members.

2. A unitary floor and frame structure for vehicles, comprising in combination an assembly of a plurality of elongate longitudinal members in mutual lateral edge contact, each of said longitudinal members having a vertical web and a horizontal floor-forming flange projecting from one side only of said web at its upper edge, the flanges of the members at opposite sides of the central longitudinal axis of the assembly projecting from their webs toward said central axis, the flanges of the two members immediately adjacent the central axis mutually contacting along the length of their edges, the flanges of all the other members contacting an adjacent member along the length of the upper edge of the latter's vertical web, means interlocking all the members together along their lengths of contact, a fifth wheel plate attached to and bearing upwardly on the lower flanges of the longitudinal members near one end of the assembly, and a load distributing beam above and bearing on the fifth wheel plate, extending transversely under the assembly of longitudinal members and bearing upwardly against said members.

3. In a vehicle, the combination of two unitary laterally extending supporting and load distributing beams spaced from each other in a longitudinal direction, and a unitary floor and frame structure resting on and supported by said supporting and load distributing beams at longitudinally spaced points and having a longitudinal extent between said points of support; said unitary floor and frame structure in its said longitudinal extent consisting substantially exclusively of an assemblage of a plurality of substantially identic elongate longitudinal members in effective mutual lateral edge contact, each of said longitudinal members having a longitudinal vertical web and an effectively integral horizontal floor-forming longitudinal flange projecting predominantly from one side of said web at its upper edge, the predominant upper flange projection of the members at opposite sides of a substantially central longitudinal axis of the assembly projecting from their webs toward said axis, the predominant upper flange projections of the two members immediately adjacent the said longitudinal axis extending inwardly toward and into effective contact with each other, the predominant upper flange projections of all the other members extending toward and into effective contact with the upper edge of the next inwardly adjacent member, means interconnecting the several longitudinal members to prevent their relative longitudinal movement, and transverse tension tie means located in the longitudinal spacing of the load supporting and distributing beams, extending transversely across all the several longitudinal members in a plane below their upper flanges, and tying together the lower parts of the several longitudinal members at opposite sides of said longitudinal axis to prevent their flexure outwardly away from each other.

4. The combination defined in claim 3, and in which said transverse load supporting and distributing beams bear upwardly on the said several longitudinal members and are attached thereto.

5. The combination defined in claim 3, in which each said longitudinal member has a second longitudinal flange projecting horizontally from the lower edge of its web and of less lateral width than the upper floor forming flange, leaving an open space between the edge of each lower flange and the web of an adjacent longitudinal member, at least one of said transverse load supporting and distributing beams bearing upwardly on said lower flanges, and brackets attached to said beam, extending up into said open spaces and attached to said longitudinal members.

6. The combination defined in claim 3, including a fifth wheel plate structure attached to and bearing upwardly on the lower edges of certain of the longitudinal members near one end of the assembly, one of said load supporting and distributing beams being adjacent to and supported from said fifth wheel structure and extending transversely under and supporting the several longitudinal members.

7. The combination defined in claim 3, including a fifth wheel plate structure attached to and bearing upwardly on the lower edges of certain of the longitudinal members near one end of the assembly, said longitudinal members being cut away in their lower portions from the fifth wheel structure toward said assembly end, and one of said load supporting and distributing beams being above and bearing on the fifth wheel plate structure, and extending transversely under and bearing upwardly against the several longitudinal members of the assembly.

References Cited in the file of this patent

UNITED STATES PATENTS

| | | |
|---|---|---|
| 578,990 | Heron | Mar. 16, 1897 |
| 713,748 | Carnahan | Nov. 18, 1902 |
| 2,256,037 | Reid | Sept. 16, 1941 |
| 2,363,170 | Fontaine | Nov. 21, 1944 |
| 2,405,260 | Kedwinka | Aug. 6, 1946 |
| 2,615,751 | Black | Oct. 28, 1952 |
| 2,662,793 | Lindsay | Dec. 15, 1953 |
| 2,718,288 | Boyer | Sept. 20, 1955 |
| 2,773,716 | Bohlen | Dec. 11, 1956 |